May 6, 1941.　　　　M. GLOWKA　　　　2,241,198
WARNING VALVE FOR FLAT TIRES
Filed Nov. 20, 1940　　　　2 Sheets-Sheet 1

INVENTOR
Martin Glowka
BY
ATTORNEY

May 6, 1941. M. GLOWKA 2,241,198
WARNING VALVE FOR FLAT TIRES
Filed Nov. 20, 1940 2 Sheets-Sheet 2

INVENTOR
Martin Glowka
BY
ATTORNEY

Patented May 6, 1941

2,241,198

UNITED STATES PATENT OFFICE 2,241,198

WARNING VALVE FOR FLAT TIRES

Martin Glowka, New York, N. Y.

Application November 20, 1940, Serial No. 366,334

4 Claims. (Cl. 116—34)

This invention relates to new and useful improvements in a warning valve for flat tires.

The invention proposes in combination with the inner tube of the tire of a vehicle a mechanism which will whistle when the tire is partially deflated and the vehicle is being driven.

More specifically, the invention proposes the provision of a compressible bulb disposed within the inner tube and mounted in a particular way on a stem which engages through the inner tube, and a novel construction of the stem to cause whistling when the bulb is periodically compressed and the vehicle travels.

Still further the invention proposes a novel arrangement for connecting the compressible bulb and stem together.

Still further an arrangement is proposed whereby the said stem is provided with an extra passage and a tire valve, so arranged that the inner tube may be inflated through the stem.

Still further the invention contemplates various forms for the compression bulb.

Another object of the invention resides in a modification in which the compressible bulb is associated with valves in a certain way so that it may receive the same air utilized to blow up the inner tube, and this air is controlled to sound the whistle in the event that the tire is partially flat.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
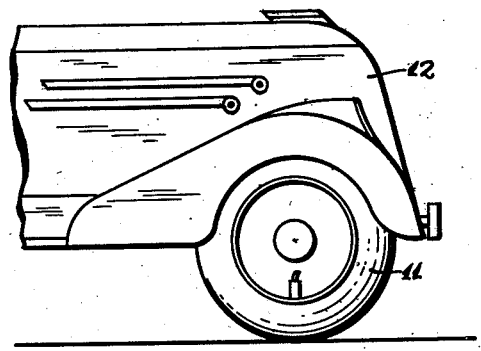
Fig. 1 is a side elevational view of a vehicle with a tire having an inner tube constructed in accordance with this invention.
Figure 2:
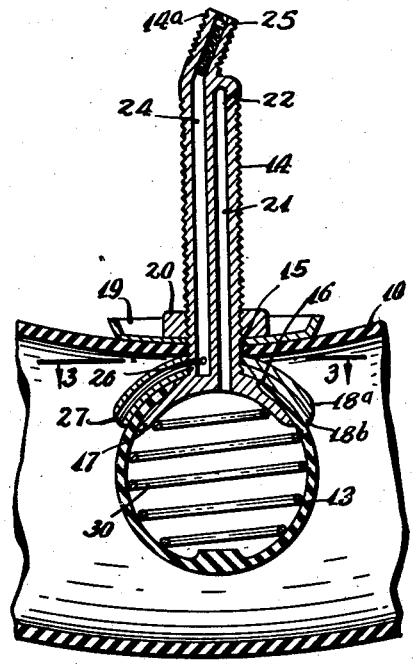
Fig. 2 is a fragmentary enlarged longitudinal sectional view of the inner tube with the warning valve constructed according to this invention.

The warning valve for flat tires, in accordance with this invention, is used in combination with the inner tube 10 of the tire 11 of a vehicle 12. A compressible bulb 13 is disposed within the inner tube 10. A stem 14 engages through an opening 15 in the inner wall of the said inner tube and through an opening 16 in said bulb 13. The stem 14 is provided with a head 17 on its inner end which is disposed within the bulb 13. A base clamp element 18 is mounted on the stem 14 outside the bulb 13 and engages over the edge portions of the said opening 16 in said bulb 13 and is cooperative with the head 17 of the stem for supporting the bulb 13 on the inner end of the stem. More specifically, the stem 14 is exteriorly threaded. The base clamp element 17 is interiorly threaded and threadedly engaged on the threads of the stem 14.

An outer clamp element 19 is disposed on the stem 14 on the outside of the inner tube 10 and engages over the edge portions of the opening 15 in the tube 10 and is cooperative with the base clamp element 18 for supporting the stem 14 on the tube 10. The outer clamp element 19 is provided with an opening by which it is slipped on the stem 14. A nut 20 is threadedly engaged on the stem 14 and abuts the outer clamp element 19 for holding it in position.

The stem 14 is provided with a passage 21 from its inner end to its extended end portion. This passage has a discharge section 22 fashioned to whistle when said bulb 13 is periodically compressed when the tire 11 is partially deflated and the vehicle 12 is traveling. The stem 14 is provided with another passage 24 extended inwards from its outer end and controlled with the usual tire valve 25. The stem 14 has a reduced outer end portion 14ᵃ which is externally threaded for receiving the usual tire valve cap, not illustrated on the drawings.

The passage 24 communicates with several radial passages 26 formed in the material of the stem 14 at the inner end of the passage 24. These passages 26 are adapted to align with the enlarged inner ends of certain of a plurality of passages 27 formed in the base clamp element 18. This base clamp element 18 is constructed of two sections, a top section 18ᵃ and a bottom section 18ᵇ. These sections are riveted or welded together. The adjacent faces of these sections are formed with the grooves 27 comprising a passage for air. A heavy spring 30 is disposed within the compressible bulb 13 to normally hold it in an expanded position.

The operation of this form of the invention is as follows:

The tire 11 may be inflated by placing the usual air supply line against the portion 14ᵃ of the stem 14. The air pressure will open the valve 25 and enter the passage 24, the passages 26 and 27, and discharge interiorly of the inner tube 10, inflating the tire 11. If, during the operation of the vehicle 12 the tire 11 becomes sufficiently deflated that the bulb 13 will be compressed each time it reaches a bottom position during the turning of the wheel having the tire 11, air from the inside of the bulb 13 will be forced through the passage 21 and through the whistle element 22 producing a whistling sound. This is a warning signal to the operator of the vehicle that the tire requires additional air.

Figure 4:
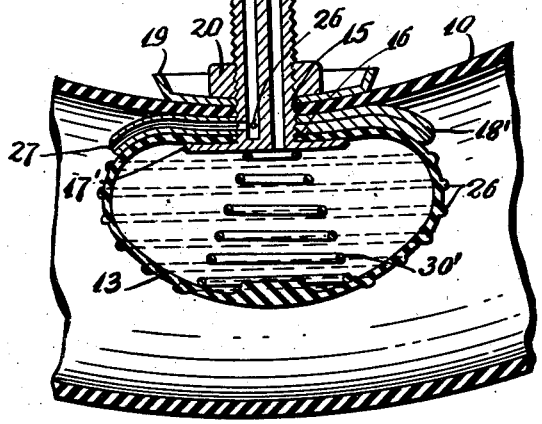
Fig. 4 is a vertical sectional view similar to Fig. 2 but illustrating another form of the invention.
Figure 3:
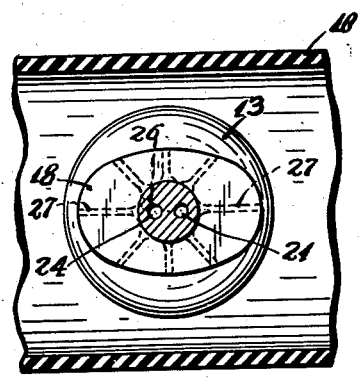
Fig. 3 is a fragmentary horizontal sectional view taken on the line 3—3 of Fig. 2.

In Fig. 4 a modified form of the invention is disclosed which distinguishes from the prior form merely in the construction of the compressible tube 13'. This compressible bulb is provided with a plurality of stiffening ribs 26 rendering the walls of the bulb sufficiently strong to withhold the collapsing tendency of the compressed air within the inner tube 10. With this arrangement a relatively small spring 30' is merely necessary to extend the bulb 13' in a radial direction relative to the tire 11. In this form of the invention the base clamp 18' is of a slightly different shape than that previously described for better coaction with the head 17' and the outer clamp 19 to hold the stem 14 in position. In other respects this form of the invention is similar to the previous form and like parts are identified by like reference numerals.

Figure 5:
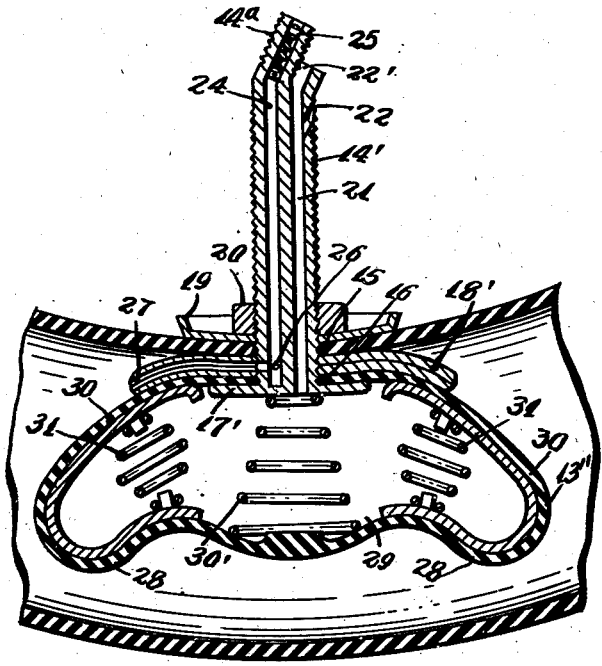
Fig. 5 is another sectional view similar to Fig. 2 but illustrating still another modified form of the invention.

In Fig. 5 another form of the invention is disclosed which is similar to the form shown in Fig. 4 distinguishing merely in the construction of the compressible bulb 13". In this form of the invention the bulb 13' is of elongated shape. It has end portions 28 extending in opposite directions from the central portion 29. These end portions are expanded by a leaf spring 30 mounted in each end portion thereof. Helical springs 31 are mounted between the ends of the leaf springs 30 to assist in keeping these end portions expanded. The leaf springs 30 are of C-shape as shown on the drawing. The stem 14' in this form of the invention is also provided with an auxiliary discharge end 22'. This is in addition to the whistle passage opening 22. This construction produces a whistle of a different sound. The discharged air will simultaneously pass through the passage 22 and 22' during the whistling operation.

Figure 6:
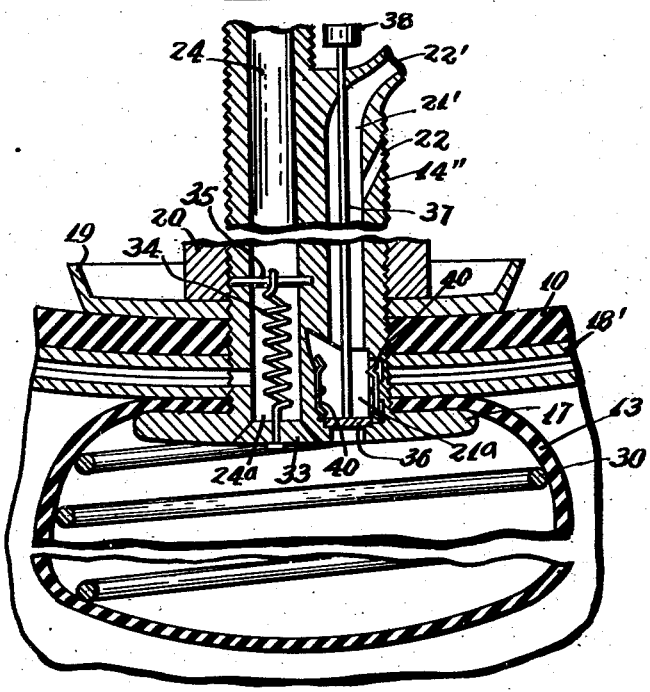
Fig. 6 is still another sectional view similar to Fig. 2 illustrating another modification thereof.

In Fig. 6 still another form of the invention has been disclosed in which the warning valve has a stem portion 14" cooperative with a bulb 13 provided with a spring 30 as previously described. The stem 14" is also cooperative with the base clamp plate 18', the outer clamp plate 19, and the nut 20. The passage 24 has a bottom branch portion 24ᵃ discharging into the bulb 13. However, this branch portion 24ᵃ is closed with a check valve 33. The valve 33 is connected with a spring 34 mounted on a pin 35. The spring 34 normally urges the valve 33 closed. However, when a tire is being inflated, air will pass from the passage 24 through the passages 26 and 27 to inflate the inner tube 10 and some of the air will force the valve 33 open and enter the compressible bulb 13 so that the internal pressure in the bulb will be the same as the internal pressure in the tube 10.

The passage 21' is provided with a spring loaded valve 36. This valve is connected with a stem 37 which extends upwards and out from the stem 14". A knob 38 is mounted on the outer end of the stem 37 by which the valve 36 may be reclosed when desired. Several springs 40 are mounted in the large portion 21ᵃ of the passage 21 and engage the valve 36 for holding this valve closed. These springs 40 are also adapted to hold the valve open once it is forced open. The stem 14" is provided with whistle passages 22 and 22'. In other respects this form of the invention is identical to the previous forms.

The operation of this form of the device is as follows:

When the inner tube 10 is inflated the compressible bulb 13 will be simultaneously inflated so that the internal pressures of the tube 10 and bulb 13 are identical. When the inner tube 10 becomes partially deflated the bulb 13 will retain its pressure until the bottom of the bulb starts being compressed each time the warning valve reaches a position at the bottom of the wheel during the travel of the vehicle. Compression of the bulb 13 will increase its internal pressure causing the valve 36 to move upwards and open and remain open because of the springs 40. The compressed air in the bulb 13 may now escape through the passage 21' and out of the openings 22 and 22', sounding the whistle. This whistle signal will be very loud because it is being operated with compressed air.

The valve 36 may be manually closed by pressing the knob 38 inwards. Then the inner tube 10 and the bulb 13 is ready to be reinflated.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In combination with an inner tube for a tire of a vehicle, a compressible bulb within said inner tube, a stem engaging through an opening in the inner wall of said inner tube and through an opening in said bulb and having a head on its inner end disposed within said bulb, a base clamp element on said stem and outside of said bulb and engaging over the edge portions of the opening in said bulb and cooperative with said head for supporting said bulb, an outer clamp element on said stem and outside of said tube and engaging over the edge portions of the opening in said inner tube and cooperative with said base clamp for supporting said stem on said inner tube, said stem having a passage from its inner end to its extended end portion fashioned to whistle when said bulb is periodically compressed when said tire is partially flat and said vehicle travels, and a spring interiorly of said compressible bulb for holding it expanded, said compressible bulb being provided with ribs reinforcing the walls thereof to be capable of withstanding the air pressure within said inner tube.

2. In combination with an inner tube for a tire of a vehicle, a compressible bulb within said inner tube, a stem engaging through an opening in the inner wall of said inner tube and through an opening in said bulb and having a head on its inner end disposed within said bulb, a base clamp element on said stem and outside of said bulb and engaging over the edge portions of the opening in said bulb and cooperative with said head for supporting said bulb, an outer clamp element on said stem and outside of said tube and engaging over the edge portions of the opening in said inner tube and cooperative with said base clamp for supporting said stem on said inner tube, said stem having a passage from its inner end to its extended end portion fashioned to whistle when said bulb is periodically compressed when said tire is partially flat and said vehicle travels, and a spring interiorly of said compressible bulb for holding it expanded, said compressible bulb being provided with ribs reinforcing the walls thereof to be capable of withstanding the air pressure within said inner tube, and a spring within said compressible bulb for keeping the bottom thereof resiliently expanded.

3. In combination with an inner tube for a tire of a vehicle, a compressible bulb within said inner tube, a stem engaging through an opening in the inner wall of said inner tube and through an opening in said bulb and having a head on its inner end disposed within said bulb, a base clamp element on said stem and outside of said bulb and engaging over the edge portions of the opening in said bulb and cooperative with said head for supporting said bulb, an outer clamp element on said stem and outside of said tube and engaging over the edge portions of the opening in said inner tube and cooperative with said base clamp for supporting said stem on said inner tube, said stem having a passage from its inner end to its extended end portion fashioned to whistle when said bulb is periodically compressed when said tire is partially flat and said vehicle travels, said stem having an air inlet passage controlled with a tire valve, said air passage connecting with additional passages through the wall of said stem, which in turn connect with passages through said base clamp to the interior of said inner tube.

4. In combination with an inner tube for a tire of a vehicle, a compressible bulb within said inner tube, a stem engaging through an opening in the inner wall of said inner tube and through an opening in said bulb and having a head on its inner end disposed within said bulb, a base clamp element on said stem and outside of said bulb and engaging over the edge portions of the opening in said bulb and cooperative with said head for supporting said bulb, an outer clamp element on said stem and outside of said tube and engaging over the edge portions of the opening in said inner tube and cooperative with said base clamp for supporting said stem on said inner tube, said stem having a passage from its inner end to its extended end portion fashioned to whistle when said bulb is periodically compressed when said tire is partially flat and said vehicle travels, said stem having an air inlet passage controlled with a tire valve, said air passage connecting with additional passages through the wall of said stem, which in turn connect with passages through said base clamp to the interior of said inner tube, and another passage from said air inlet passage to the interior of said compressible bulb controlled with a check valve, and a spring loaded valve controlling discharge through said passage which is fashioned to whistle.

MARTIN GLOWKA